(12) United States Patent
Long, II et al.

(10) Patent No.: US 7,204,662 B1
(45) Date of Patent: Apr. 17, 2007

(54) CUTTING TOOL WITH STRESS SPLITTER

(75) Inventors: Thomas J. Long, II, Greensburg, PA (US); Ruy Frota de Souza Filho, Latrobe, PA (US); Jeffrey F. Kovac, Loyalhanna, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/281,275

(22) Filed: Nov. 17, 2005

(51) Int. Cl.
*B26D 1/12* (2006.01)
*B23C 5/00* (2006.01)
(52) U.S. Cl. .......................... 407/34; 407/67; 407/103
(58) Field of Classification Search ................ 407/34, 407/66, 67, 103, 42
See application file for complete search history.

(56) References Cited

U.S. PATENT DOCUMENTS

| | | | | |
|---|---|---|---|---|
| 5,451,128 A | * | 9/1995 | Hattersley | 408/204 |
| 5,542,795 A | * | 8/1996 | Mitchell | 407/35 |
| 5,685,670 A | * | 11/1997 | Satran | 407/42 |
| 6,203,251 B1 | * | 3/2001 | Oppelt et al. | 407/48 |
| 6,536,996 B2 | * | 3/2003 | Satran et al. | 407/34 |
| 6,974,280 B2 | * | 12/2005 | Satran et al. | 407/42 |

* cited by examiner

*Primary Examiner*—Willmon Fridie, Jr.
(74) *Attorney, Agent, or Firm*—Larry R. Meenan

(57) ABSTRACT

A cutting tool includes a tool body having a plurality of insert receiving pockets and at least one cutting insert mounted in each pocket. Each pocket includes a pocket base wall, a side wall and a stress relief groove. The tool body also includes a top surface including a first portion and a second portion, and a stress splitter that extends from the stress relief groove and intersects the first and second portions. The stress splitter may be in the form of a sharp peak or ridge, a radiused peak, rounded mass or protuberance, and the like. The stress splitter reduces a maximum amount of stress in an area of the stress relief groove during a machining operation.

24 Claims, 5 Drawing Sheets

CUTTING TOOL WITH STRESS SPLITTER

BACKGROUND OF THE INVENTION

In a cutting tool, for example, an end mill cutting tool, it has been observed that a high stress area exists in the corner of the insert pocket at the stress relief when it is intersected by a radius.

Cutting tools, such as milling cutters, are rotatable tools of cylindrical, conical, shaped or disk form, having a plurality of cutting edges. Such cutters are available in many forms, such as plain cylindrical, side milling cutters, face and end mills, formed cutters, and standard and special shaped profile cutters.

End mills employing cutting inserts mounted at the front end of the tool are known in the art. The end mills can be used in several types of applications depending on the configuration of the cutting inserts mounted therein. The cutting inserts may present a peripheral cutting edge for side milling, a front cutting edge for face milling and a curved cutting edge of a so-called "ball-nose" end mill for various copying applications. Four flute mills are probably the most common, but 2, 3 or 6 flutes are also used extensively. End mills are in much used because they can execute a wide variety of milling operations, and the initial cost of the cutter is moderate. Shapes other than cylindrical are also in common use. The shank can be parallel or tapered, and need not necessarily be equal to the cutter teeth diameter.

Usually when an end mill is in operation, the machining force is exerted against one edge of the cutter. The resulting moment is resisted by the tool holder which rigidly grips the cutter shank. Ignoring the fact that the direction of the moment changes continually as the cutter revolves, the cutter can be considered to be stressed as a cantilever.

As shown in FIG. 6, a cutting tool 100, such as an end mill, includes a tool body 114 including a top surface 134, an insert receiving pocket 122 with a threaded bore 138, a side wall 126 and a stress relief groove 124 therebetween. Measurements have shown that a maximum equivalent stress of approximately $1.063 \times e^5$ psi is located at an area of the stress relief groove 124 adjacent the top surface 134.

While the matter of stress discussed above is related to avoiding tool breakage, no less important is the requirement to minimize tool deflection, in order to improve accuracy and surface finish and to reduce vibration and noise. A constant diameter core results in more tool deflection than necessary, because the high bending moment close to the tool holder, and also near the ends of the tooth flutes nearest the cutter shank, results in bending of the cutter as a result of machining forces. The resultant cutter deflection at the cutting edge would be reduced if the tool steel comprising the cutter core were distributed in a better manner, that is more metal were allocated to the sections under greater stress, at the expense of the more lightly stressed toothed end of the cutter.

Accordingly, there is a need for an improved cutting tool that can overcome the limitations of the known cutting tool, and reduce or eliminate the overall stress of the cutting tool.

BRIEF SUMMARY OF THE INVENTION

To solve these and other problems associated with conventional cutting tools, the inventors of the present invention have developed a cutting tool comprising a tool body including a plurality of insert receiving pockets and at least one cutting insert mounted in each pocket, each pocket comprising a pocket base wall, a side wall and a stress relief groove therebetween, and a top surface including a first portion and a second portion, wherein the top surface further includes a stress splitter at an intersection between the first and second portions, wherein the stress splitter reduces a maximum amount of stress in an area of the stress relief groove during a machining operation.

In another aspect of the invention, a tool body comprises a plurality of insert receiving pockets, each pocket comprising a pocket base wall, a side wall and a stress relief groove therebetween, and a top surface including a first portion and a second portion, wherein the top surface further includes a stress splitter at an intersection between the first and second portions, wherein the stress splitter reduces a maximum amount of stress in an area of the stress relief groove during a machining operation.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
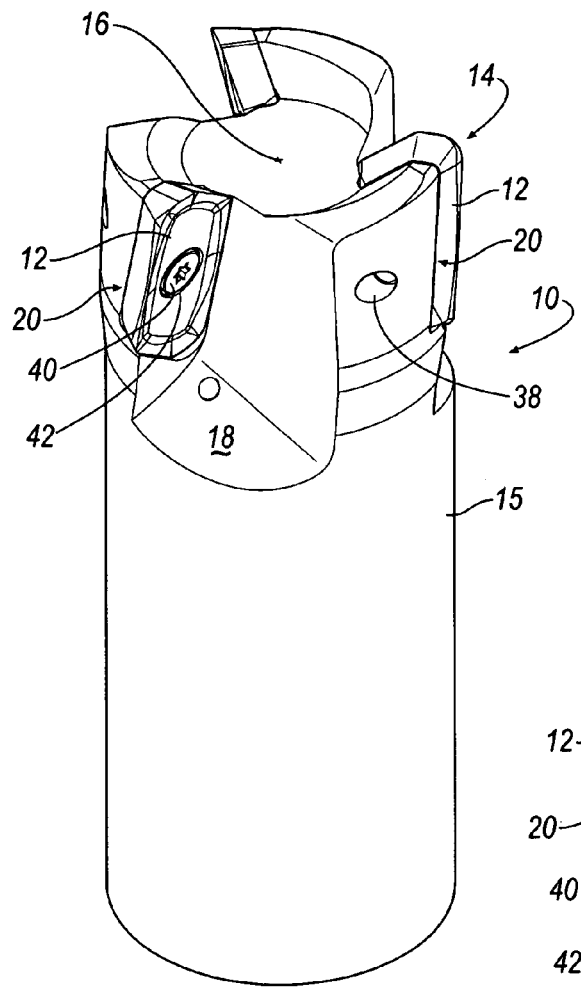
FIG. 1 is a perspective view of a milling cutter with a stress splitter according to an embodiment of the invention.

Referring to the drawings, wherein like reference characters represent like elements, there is shown in FIG. 1 a cutting tool 10 with an associated set of cutting inserts 12 shown installed within tool 10. The cutting tool 10 comprises a tool body 14 which is generally radially symmetrical about its rotational axis 16. The tool body 14 is preferably cylindrical and abuts a tool shank 15. The tool body 14 and the shank 15 share common rotational axis 16. The tool body 14 preferably, but not necessarily, includes a plurality of flutes 18 each bearing a plurality of insert receiving pockets 20 therein. The insert receiving pockets 20 are rotationally symmetrically arranged with respect to the axis 16. At least one, but possibly more, of the cutting inserts 12 are configured and dimensioned to be received within and secured to each pocket 20.

Figure 2:
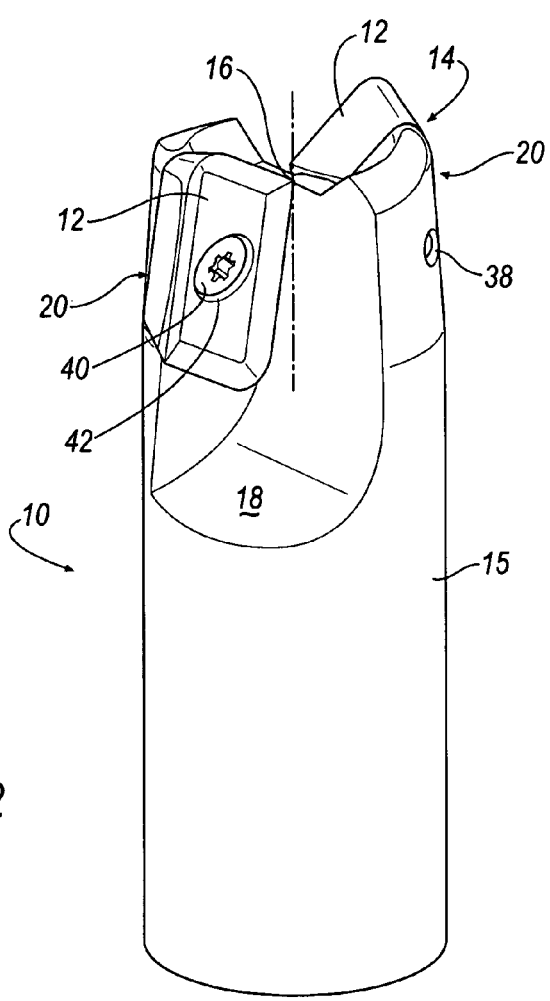
FIG. 2 is a perspective view of a different type of milling cutter with a stress splitter according to another embodiment of the invention.

In the illustrated embodiment of FIG. 1, three cutting inserts 12 are received within and secured to a corresponding pocket 20. However, it will be appreciated that the invention is not limited by the number of inserts 12 and pockets 20, and that the invention can be practiced with any desired number of inserts 12 and pockets 20. For example, the body 14 of the invention can be practiced with two inserts 12 and two pockets 20, as shown in FIG. 2. In another example, the body 14 of the cutting tool 10 can include four or more inserts 12 and pockets 20.

Each insert receiving pocket 20 has a pocket base wall 22 that may be forwardly and downwardly slanted at an acute angle with respect to the axis 16. The pocket base wall 22 constitutes a tangential abutment surface of the insert receiving pocket 20. The pocket 20 also includes a side wall 26 that constitutes a radial abutment surface for a side wall of the insert 12 when mounted in the pocket 20, as shown in FIGS. 1 and 2. A stress relief groove 24 is provided between the pocket base wall 22 and the side wall 26. In the illustrated embodiment, the stress relief groove 24 has a radius of approximately 0.047 inches (approximately 1.19 mm). However, the radius of the stress relief groove 24 varies, among other things, on the design of the cutting insert 12.

A threaded bore 38 extends through the center of the pocket base wall 22 and is substantially perpendicular thereto. In the assembled position of the cutting tool 10, each of the cutting inserts 12 is retained within an insert receiving pocket 20 by a clamping screw 40 that passes through a through bore 42 of the cutting insert 12 and threadingly engages the threaded bore 38 in the insert receiving pocket 20, as shown in FIGS. 1 and 2.

A top surface 34 of the tool body 14 includes a first portion 28 and a substantially planar second portion 29. The tool body 14 may also include a chamfered surface 30 that intersects the first portion 28 of the top surface 34, and a peripheral face 32 that intersects the pocket base wall 22 and the chamfered surface 30.

Figure 3:
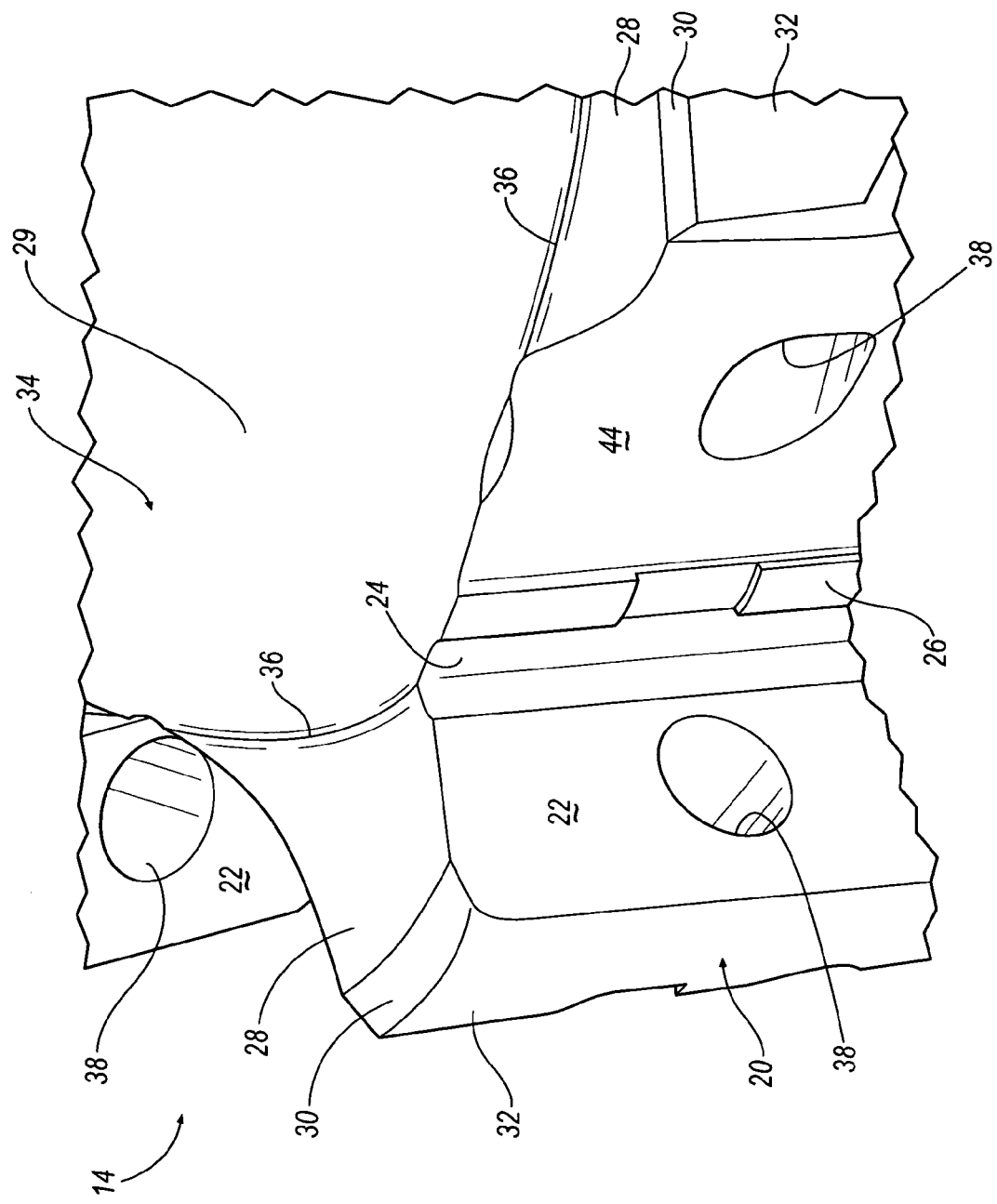
FIG. 3 is an enlarged partial perspective view of a cutter body of a milling cutter with a stress splitter and the inserts removed for clarity according to an embodiment of the invention.

Referring now to FIG. 3, one aspect of the invention is that a stress splitter 36 is provided on the top surface 34 of the tool body 14 that intersects the first portion 28 and the second portion 29. The stress splitter 36 may be in the form of a sharp peak or ridge, a radiused peak, rounded mass or protuberance, and the like. The stress splitter 36 may have a height with respect to the first and second portions 28, 29 of the top surface 34 in a range of between approximately 0.001 inches (0.0254 mm) to a maximum height approximately equal to a radius of the stress relief groove 24, depending on the particular design of the cutting tool 10. As stated earlier, the radius of the stress relief groove 24 in the illustrated embodiment is approximately 0.047 inches (approximately 1.19 mm), but can vary depending on the design of the insert 12. The maximum height of the stress relief groove 24 may also be limited to the height of the cutting edge of the insert 12.

In the illustrated embodiment shown in FIG. 3, the stress splitter 36 extends along a curve line or arc from the stress relief groove 24 to a rear face 44 of the insert receiving pocket 20. However, it is not necessary that the stress splitter 36 span the entire distance from the stress relief groove 24 to the rear face 44 of the pocket 20, and may extend only a portion of the distance from the stress relief groove 24 toward the rear face 44 of the pocket 20. For example, if the entire distance between the stress relief groove 24 is approximately 1.0 inches (25.4 mm), then the stress splitter 36 may extend only a distance of approximately 0.10 (2.54 mm) inches from the stress relief groove 24 in a direction toward the rear face 44 of the pocket 20. In addition, the stress splitter 36 does not necessarily need to extend along a substantially curved line from the stress relief groove 24, and that the invention can be practiced by the stress splitter 36 extending along any desired line shape from the stress relief groove 24, such as a substantially linear line, and the like.

Figure 4:
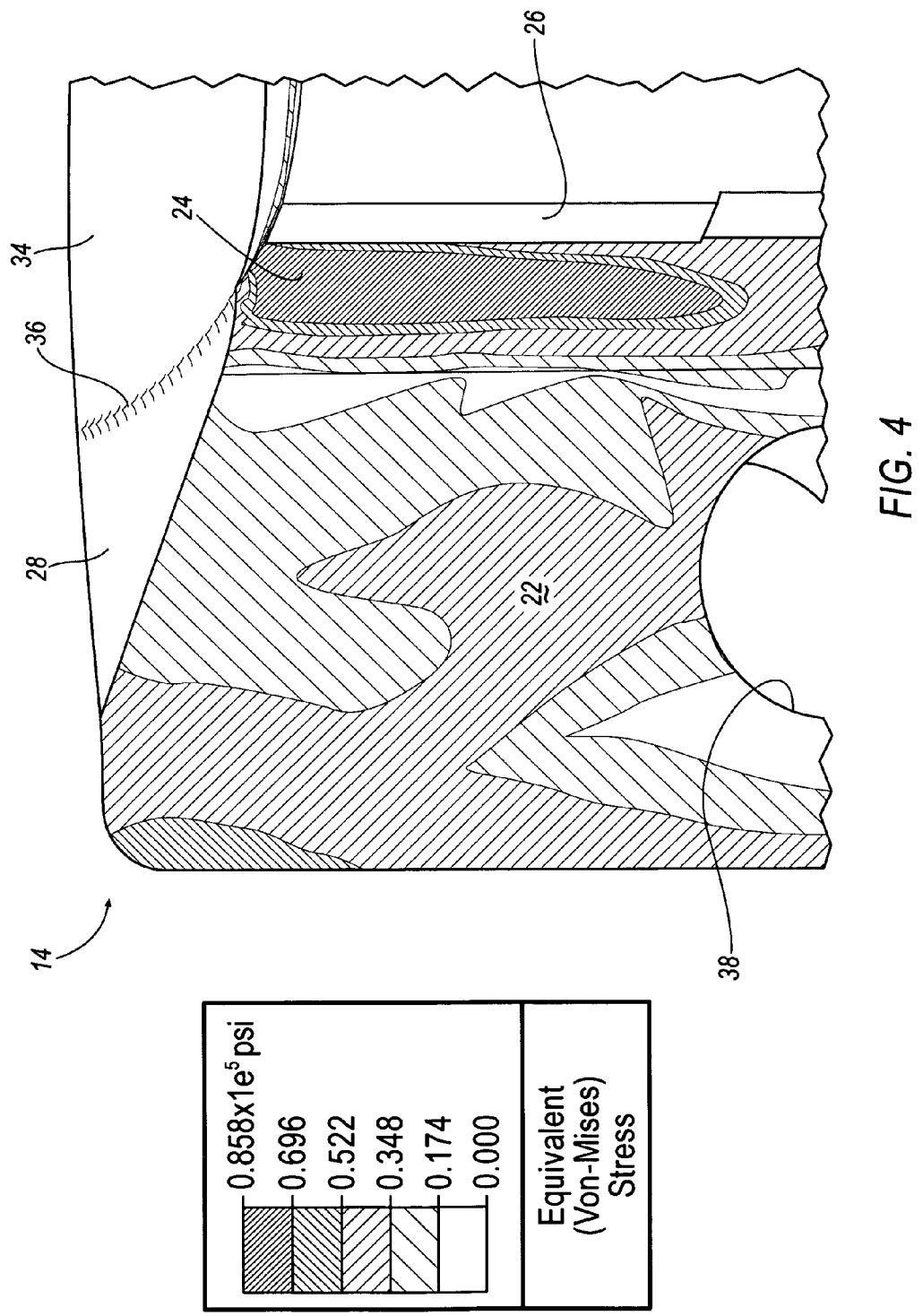
FIG. 4 shows a distribution of stress for a cutter body with a stress splitter according to an embodiment of the invention.
Figure 6:
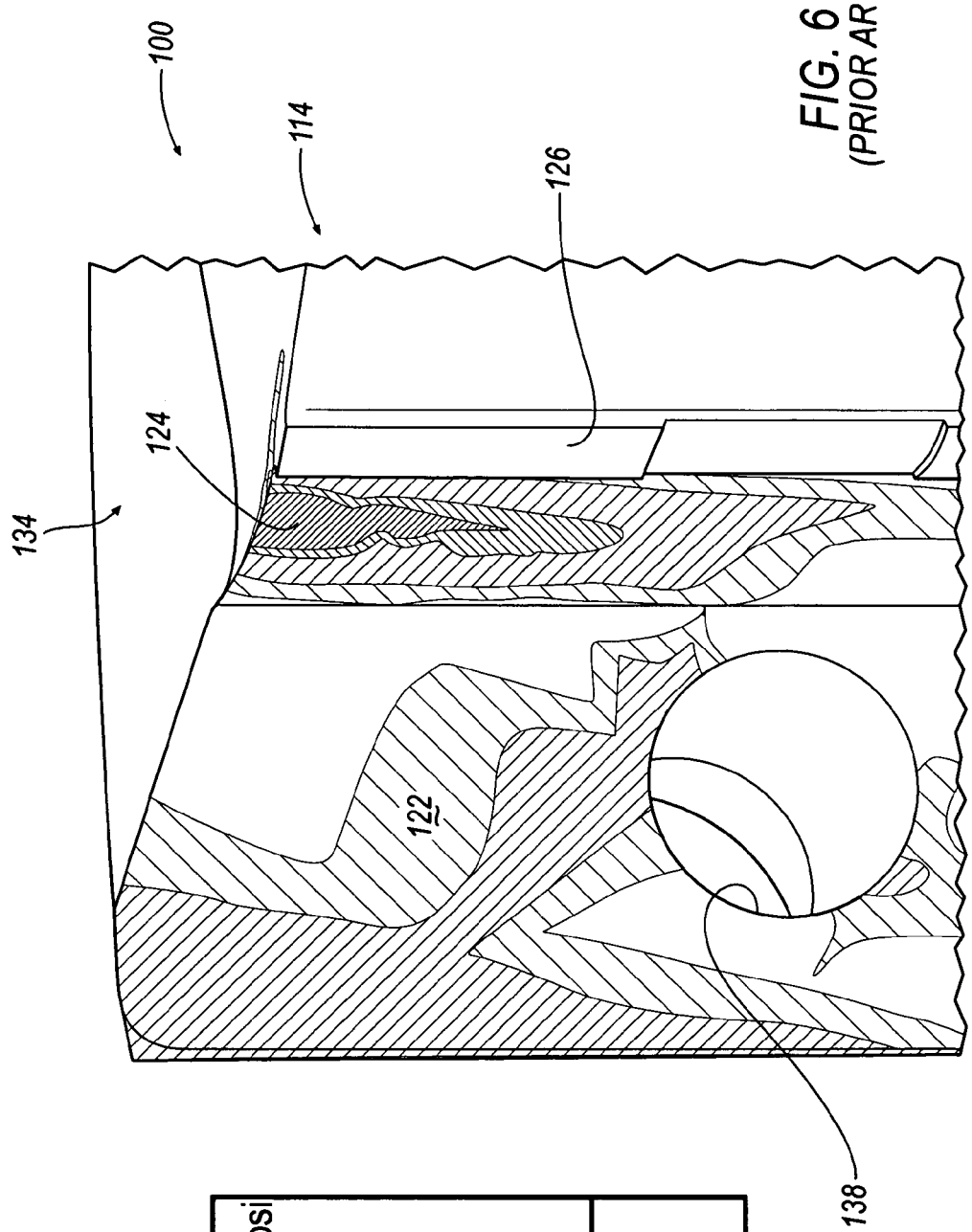
FIG. 6 is a distribution of stress for a convention cutter body without a stress splitter.

Referring now to FIG. 4, measurements of equivalent (Von-Mises) stress were made on the cutting tool 10, such as an end mill, having the tool body 14 including the stress splitter 36 in the form of a sharp ridge that intersects the first and second portions 28, 29 of the top surface 34 of the tool body 14. The stress splitter 36 is optimally located directly above where the maximum stress was located in the conventional cutting tool 100 of FIG. 6. As shown in FIG. 4, the stress splitter 36 reduced the maximum equivalent (Von-Mises) stress from approximately 106.3 ksi in the conventional cutting tool 100 to approximately 85.8 ksi, or approximately 19%. In addition, the stress splitter 36 caused the area of maximum stress to be distributed over a larger area, as compared to the conventional cutting tool 100 of FIG. 6.

Figure 5:
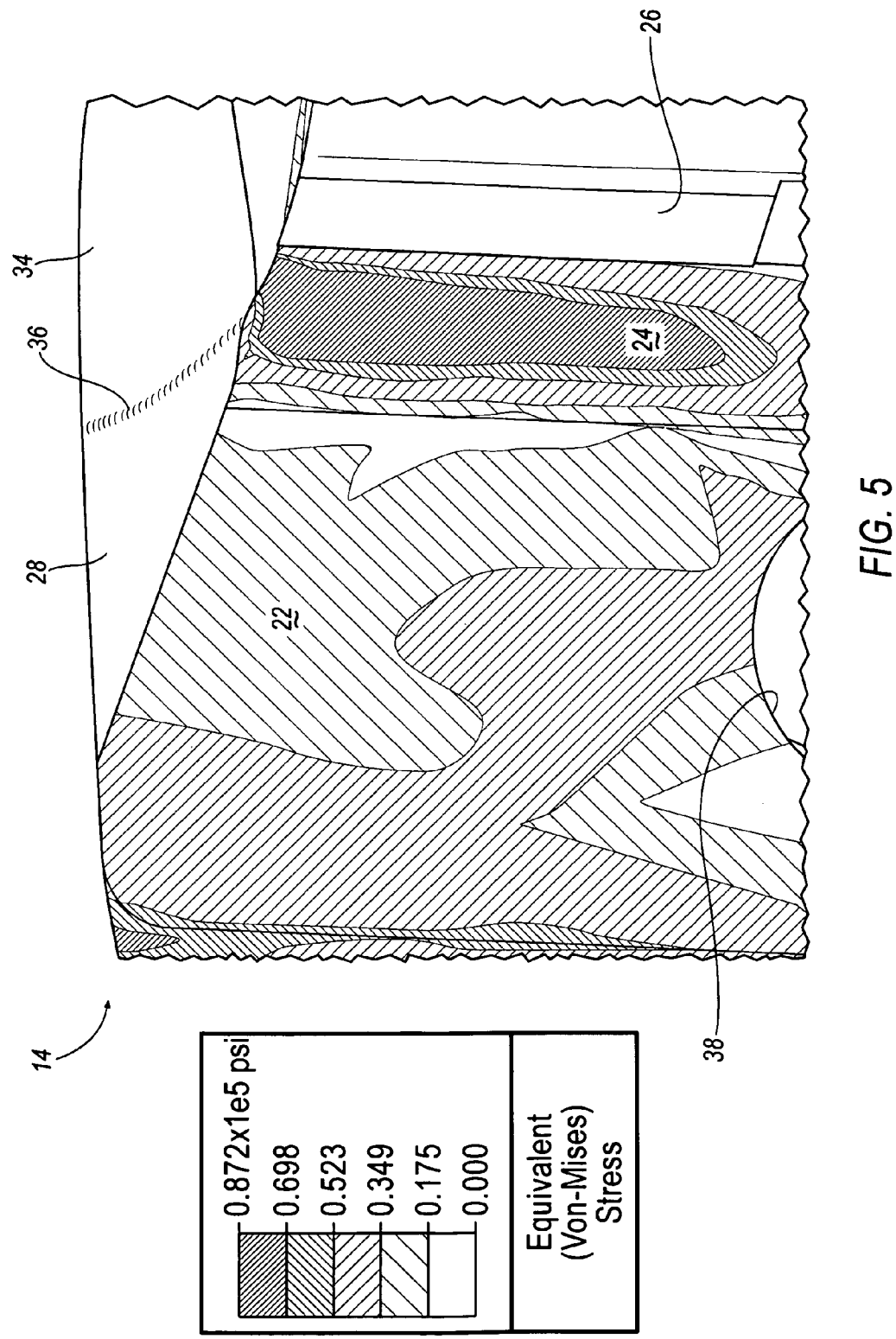
FIG. 5 is a distribution of stress for a different cutter body with a stress splitter according to an embodiment of the invention.

Referring now to FIG. 5, measurements of equivalent (Von-Mises) stress were made on the cutting tool 10, such as an end mill, having the tool body 14 including the stress splitter 36 in the form of a radiused peak or protuberance that intersects the first and second portions 28, 29 of the top surface 34 of the tool body 14. It may be noted that the location of the stress splitter 36 in FIG. 5 was not located at an optimized location directly above the maximum stress. Nevertheless, the stress splitter 36 produced the unexpected results of reducing the maximum amount of equivalent stress by approximately 18%. If the stress splitter 36 is located at an optimized location directly above the maximum stress, the reduction of the maximum amount of equivalent stress would be even greater than 18%.

As shown by the above measurements, the stress splitter 36 produces the unexpected result of reducing the maximum amount of equivalent stress by creating a minimum tensile stress (compressive stress) at a location of a maximum tensile stress (tension stress). As a result, the stress splitter 36 neutralizes the tensile stress at that location and decreases an overall stress of the cutting tool 10. The location of the maximum tensile stress was shown to be located along the stress relief groove 24 adjacent the top surface 34. By providing the stress splitter 36 at the location of maximum stress, the maximum equivalent (Von-Mises) stress was reduced at least approximately 18% as compared to the maximum equivalent stress for the conventional tool body 100, a shown in FIG. 6.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A cutting tool comprising a tool body including a plurality of insert receiving pockets and at least one cutting insert mounted in each pocket, each pocket comprising a pocket base wall extending radially outwardly from the tool body, a side wall substantially perpendicular to the pocket base wall and a stress relief groove therebetween, the tool body further comprising a top surface at one end thereof that includes a first portion substantially perpendicular to the pocket base wall and a second portion substantially perpendicular to the side wall, wherein the top surface further includes a stress splitter that extends from the stress relief groove and intersects the first and second portions, wherein the stress splitter reduces stress in the cutting tool during a machining operation.

2. The cutting tool of claim 1, wherein the stress splitter has a height in a range between approximately 0.001 inches to a maximum height approximately equal to a radius of the stress relief groove.

3. The cutting tool of claim 1, wherein the stress splitter has a height in a range between approximately 0.001 inches to a maximum height of approximately equal to a cutting edge of the cutting insert.

4. The cutting tool of claim 1, wherein the stress splitter extends from the stress relief groove to a rear face of the insert receiving pocket of the tool body.

5. The cutting tool of claim 1, wherein the stress splitter extends a portion of a distance between the stress relief groove to a rear face of the insert receiving pocket of the tool body.

6. The cutting tool of claim 1, wherein the stress splitter extends along a substantially curved line from the stress relief groove.

7. The cutting tool of claim 1, wherein the stress splitter comprises a raised ridge.

8. The cutting tool of claim 1, wherein the stress splitter comprises a protuberance.

9. A tool body comprising a plurality of insert receiving pockets, each pocket comprising a pocket base wall extending radially outwardly from the tool body, a side wall substantially perpendicular to the pocket base wall and a stress relief groove therebetween, the tool body further comprising a top surface at one end thereof that includes a first portion substantially perpendicular to the pocket base wall and a second portion substantially perpendicular to the side wall, wherein the top surface further includes a stress splitter that extends from the stress relief groove and intersects the first and second portions, wherein the stress splitter reduces stress in the cutting tool during a machining operation.

10. The tool body of claim 9, wherein the stress splitter has a height in a range between approximately 0.001 inches to a maximum height approximately equal to a radius of the stress relief groove.

11. The cutting tool of claim 9, wherein the stress splitter extends from the stress relief groove to a rear face of the insert receiving pocket of the tool body.

12. The cutting tool of claim 9, wherein the stress splitter extends a portion of a distance between the stress relief groove to a rear face of the insert receiving pocket of the tool body.

13. The cutting tool of claim 9, wherein the stress splitter extends along a substantially curved line from the stress relief groove.

14. The cutting tool of claim 9, wherein the stress splitter comprises a raised ridge.

15. The cutting tool of claim 9, wherein the stress splitter comprises a protuberance.

16. The cutting tool of claim 1, wherein the pocket base wall of at least one insert receiving pocket is forwardly and downwardly slanted at an acute angle with respect to a rotational axis of the cutting tool.

17. The cutting tool of claim 9, wherein the pocket base wall of at least one insert receiving pocket is forwardly and downwardly slanted at an acute angle with respect to a rotational axis of the cutting tool.

18. The cutting tool of claim 9, wherein the stress splitter has a height in a range between approximately 0.001 inches to a maximum height of approximately equal to a cutting edge of the cutting insert.

19. A tool body comprising a plurality of flutes, each flute including an insert receiving pocket, each pocket including a pocket base wall extending radially outwardly from the tool body, a side wall, the pocket base wall constituting a tangential abutment surface and the side wall constituting a radial abutment surface for an insert mounted in the insert receiving pocket, each pocket further including a rear face and a stress relief groove between the pocket base wall and the side wall, the tool body further comprising a top surface at one end thereof that includes a first portion substantially perpendicular to the pocket base wall and a second portion substantially perpendicular to the side wall, and a stress splitter extending from the stress relief groove toward the rear face and between the first and second portions.

20. The tool body of claim 19, wherein the stress splitter has a height in a range between approximately 0.001 inches to a maximum height approximately equal to a radius of the stress relief groove.

21. The tool body of claim 19, wherein the stress splitter has a height in a range between approximately 0.001 inches to a maximum height of approximately equal to a cutting edge of the cutting insert.

22. The tool body of claim 19, wherein the stress splitter extends along a substantially curved line from the stress relief groove.

23. The tool body of claim 19, wherein the stress splitter comprises a raised ridge.

24. The tool body of claim 19, wherein the stress splitter comprises a protuberance.

* * * * *